(12) United States Patent
Wang et al.

(10) Patent No.: US 8,342,079 B2
(45) Date of Patent: Jan. 1, 2013

(54) MULTIFUNCTIONAL SOYBEAN MILK MAKER

(75) Inventors: Xuning Wang, Jinan (CN); Fenghui Zuo, Jinan (CN)

(73) Assignee: Joyoung Company Limited, Jinan, Shandong (CN)

( * ) Notice: Subject to any disclaimer, the term of this patent is extended or adjusted under 35 U.S.C. 154(b) by 462 days.

(21) Appl. No.: 12/596,594

(22) PCT Filed: Apr. 17, 2008

(86) PCT No.: PCT/CN2008/070736
§ 371 (c)(1),
(2), (4) Date: Oct. 19, 2009

(87) PCT Pub. No.: WO2008/128467
PCT Pub. Date: Oct. 30, 2008

(65) Prior Publication Data
US 2010/0139494 A1 Jun. 10, 2010

(30) Foreign Application Priority Data

Apr. 20, 2007 (CN) .......................... 2007 1 0098337

(51) Int. Cl.
*A47J 43/044* (2006.01)
*B01F 7/20* (2006.01)
(52) U.S. Cl. .............. 99/286; 99/348; 99/510; 366/146; 366/249; 366/251
(58) Field of Classification Search ............ 99/348, 99/510, 282, 286, 331, 333, 338; 366/197, 366/249, 146, 251
See application file for complete search history.

(56) References Cited

U.S. PATENT DOCUMENTS

| | | | | |
|---|---|---|---|---|
| 5,852,965 A | * | 12/1998 | Kim | 99/281 |
| 5,980,099 A | * | 11/1999 | Soon | 366/204 |
| 6,155,161 A | * | 12/2000 | Chan | 99/348 |
| 7,395,751 B2 | * | 7/2008 | Liu | 99/348 |
| 2006/0027102 A1 | | 2/2006 | Burrows et al. | |

FOREIGN PATENT DOCUMENTS

| | | |
|---|---|---|
| CN | 2290997 Y | 9/1998 |
| CN | 1613410 A | 5/2005 |
| CN | 2722791 Y | 9/2005 |
| CN | 2834367 Y | 11/2006 |
| CN | 2857718 Y | 1/2007 |
| CN | 101028171 Y | 9/2007 |
| CN | 101032375 A | 9/2007 |
| CN | 201026120 Y | 2/2008 |
| CN | 201026123 Y | 2/2008 |
| CN | 201026150 Y | 2/2008 |
| JP | 2001-299260 | 10/2001 |
| JP | 2006-094882 | 4/2006 |

* cited by examiner

Primary Examiner — Reginald L Alexander
(74) Attorney, Agent, or Firm — Workman Nydegger

(57) ABSTRACT

A multifunctional soybean milk maker is provided. The soybean milk maker comprises: a head, a motor, a cup body, a cutter shaft, a cutting tool and a control circuit board. The head caps on the cup body. The motor is fastened and arranged in the head. The head includes an upper cover of the head and a lower cover of the head. The cutter shaft extends downwards to the cup body. The cutting tool is fastened at the front end of the cutter shaft. A connector is set on the lower part of the lower cover of the head. The connector extends into the cup body. A flow-disturbing curved body is set at the lower part of the connector. The flow-disturbing curved body is positioned above the cutting tool.

13 Claims, 10 Drawing Sheets

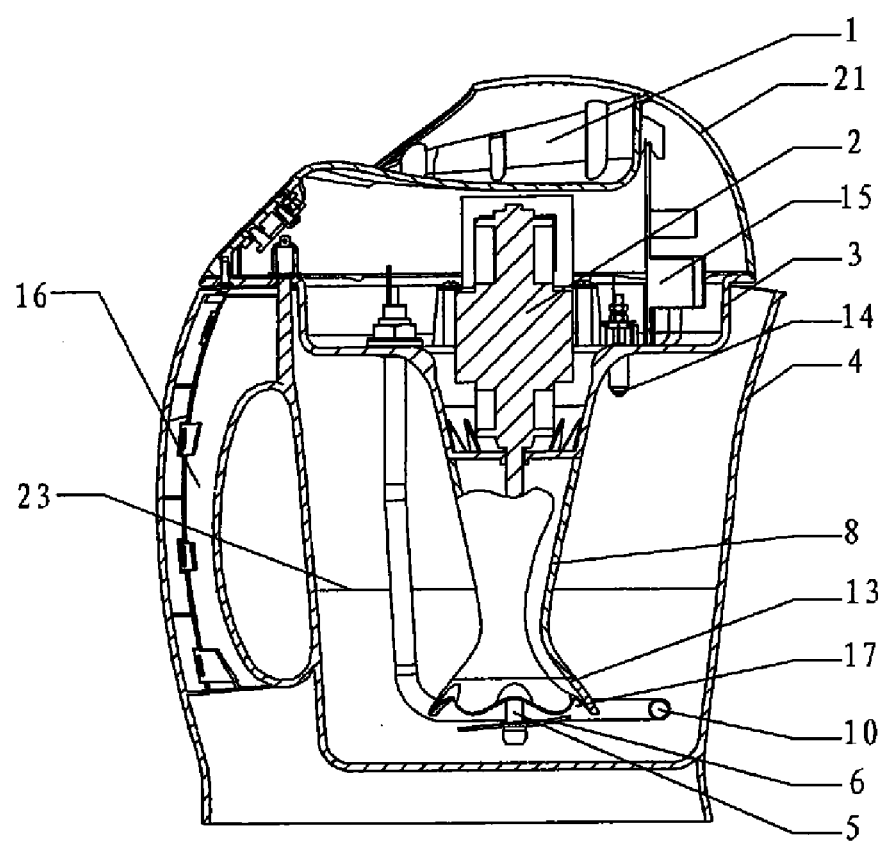

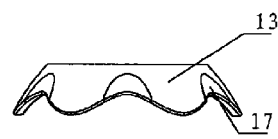 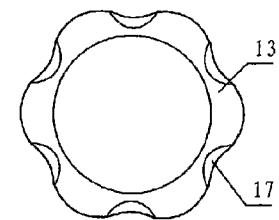
Fig. 15　　　　　　　　　Fig. 16
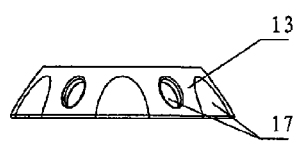 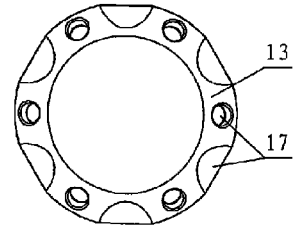
Fig. 17　　　　　　　　　Fig. 18

MULTIFUNCTIONAL SOYBEAN MILK MAKER

CROSS REFERENCE TO RELATED APPLICATION

This application claims the benefit of CN Patent Application No. 200710098337.0, entitled "MULTIFUNCTIONAL SOYBEAN MILK MAKER" filed on Apr. 20, 2007 with the State Intellectual Property Office of PRC, which is hereby incorporated by reference in its entirety.

FIELD OF THE INVENTION

The present invention relates to cooking appliance, in particular to a multifunctional soybean milk maker.

BACKGROUND

At present, soybean milk makers available on the market and used in household are divided into three types according to the working principle on bean breaking and pulping. The first type of soybean milk maker is mounted with a net cover within a cup body, beans are placed into the net cover, broken and pulped by a cutting tool projected thereinto, and then milk of broken beans flows into the cup body through holes of the net cover. A disadvantage of this type of soybean milk maker lies in that the installation and dismantling of the net cover are inconvenient and the cleaning of the net cover is also quite inconvenient according to actual use. Meanwhile, the net cover has a limited volume and therefore the amount of beans to be put into the net cover is limited, which makes influence on the concentration of soybean milk and increases the cost of production.

In the second type of soybean milk maker, the net cover is omitted, and the beans are directly put into the cup body, broken and pulped through the high speed rotation of a cutting tool. However, in practice, since water flow is driven to develop a swirl by the high speed rotation of the cutting tool, the swirl which is rotated in one and the same direction will cause the beans to rotate orderly, and the contact probability of the beans rotating orderly with the cutting tool is very small, which does not benefit to breaking the beans by the cutting tool, thus directly resulting in problems of low breaking efficiency of the cutting tool, poor pulping effect, and low milk yield.

The third type of soybean milk maker is an invention patent, announcing No. CN 2722791Y, entitled "Multifunctional full automatic soybean milk maker" published by the State Intellectual Property Office of PRC on Sep. 7, 2005. In the solution disclosed, a baffle is provided at the bottom of a barrel body, a blade fixed on a motor shaft is positioned lower than the upper edge of the baffle. The shape of the space within the barrel body is made irregular by the baffle, through changing the circulating direction of fluid, the material flowing toward a barrel wall under a radial force of the blade returns back to the proximity of the blade and is further crushed.

In an invention patent, announcing No. 2720964Y, entitled "SOYBEAN MILK, RICE PASTE DUAL-USE MACHINE" disclosed by the State Intellectual Property Office of PRC on Aug. 31, 2005, the solution disclosed therein is to provide a flow-baffling projection at the lower portion of the cup body against the side wall of the cup body. Another example is an invention, announcing No. CN2834367Y, entitled "MULTI-FUNCTIONAL SOYBEAN MILK MAKER" disclosed by the State Intellectual Property Office of PRC on Nov. 8, 2006, the solution disclosed therein is to provide a number of ribs within a pot body, which ribs are distributed on the inside wall of the pot body.

The three types of soybean milk maker described above generally have the same function in that they all make interference upon fluid through the flow-disturbing parts provided at the bottom or sidewall of the cup body, disrupting the rotating direction of the fluid and thus allowing the material to contact with the blade more sufficiently so as to improve the bean breaking efficiency. Although the problem that beans are not thoroughly broken is solved to some extent by disrupting the circulating direction of the fluid through providing baffles to change the space configuration of the barrel body, disadvantages still exist:

Firstly, since the flow-disturbing parts of the soybean milk maker are located at the bottom or sidewall of the cup body, many dead angles are formed therein, therefore it is quite inconvenient to clean the barrel body after use.

Next, the flow-disturbing parts only change and disrupt the horizontally flowing direction of the fluid, however, a large amount of foam may be produced during this change of the flowing direction, so that it is apt to cause an overflow or to falsely trigger an anti-overflow electrode, thereby resulting in a halting problem.

Further, the flow-disturbing parts serve to change and disrupt only the horizontally flowing direction of the fluid, without excellent disrupting control on the vertically flowing direction of the fluid, so that the effect for forming a disordered fluid is not yet quite desirable. At the same time, since the flow-disturbing parts are disposed parallel to each other and vertically within the barrel body, it is easy to cause the fluid to surge upward when the motor rotates the blade and thus drives the water to flow. In addition, since a large amount of foam are produced during pulping, it is apt to cause an overflow or to falsely trigger an anti-overflow electrode, and thus resulting in a halting problem.

Therefore, the following problems are still present in the current soybean milk makers: the crushing effect needs to be improved; the structure thereof is complex and is inconvenient for a user to clean after use; and much foam and louder noise are produced during pulping.

SUMMARY OF THE INVENTION

The present invention provides a multifunctional soybean milk maker with simple structure to achieve less pulp foam and reduced noise during pulping and to achieve easy cleaning.

To solve the above mentioned technical problems, the present invention provides a multifunctional soybean milk maker comprising a head, a motor, a cup body, a cutter shaft, a cutting tool and a control circuit board, the head capping on the cup body, the motor being fixedly arranged in the head, the head including an upper cover and a head lower cover, the cutter shaft extending downward to the cup body, the cutting tool being fixed at the front end of the cutter shaft, characterized in that, a connector is provided at the lower portion of the head lower cover, the connector extends into the cup body, a flow-disturbing curved body is provided at the lower end of the connector, and the cutting tool is fixedly mounted at the front end of the cutter shaft and is positioned below the flow-disturbing curved body.

It can be seen from the above described technical solution, the present invention provides a flow-disturbing curved body above the rotary cutting tool, which can bring about positive effects of transversely preventing the bean flow from rotatingly flowing upward and of turning rotating flow into turbulence. This in turn increases opportunities of the beans being crushed and ground by the cutting tool, thus resulting in excellent crushing effect. With the technical solution of the present invention in which a connector extending into the cup body is provided at the lower portion of the head lower cover, a flow-disturbing curved body is provided at the lower portion of the connector, and the cutting tool is fixedly mounted at the front end of the cutter shaft and is positioned below the flow-disturbing curved body, less pulp foam is produced during pulping, more effective pulp cooking time may be acquired when cooking the pulp, and the soybean milk can be cooked more sufficiently, thereby the taste and quality of the soybean milk is improved. In the case that no filter cover is provided, the present invention not only achieves the purpose of making pulp without a filter cover, but also brings about such positive effects as allowing the motor to run smoothly with little running noise, producing little pulp foam during pulping, and easy cleaning. The multifunctional soybean milk maker of the present invention is also completely adapted to such applications as making fruit and vegetable pulp, rice paste, and vegetable soup.

BRIEF DESCRIPTION OF THE DRAWINGS

In the following, the present invention and its embodiments will be further explained in conjunction with drawings.

FIG. 6 is a schematic structural sectional view of a full automatic soybean milk maker, an embodiment of the multifunctional soybean milk maker of the present invention, wherein the three components, i.e. the head lower cover, the connector and the flow-disturbing cover, are connected and the heating is performed by the electrothermal tube;

FIG. 7 is a schematic structural sectional view of a full automatic soybean milk maker, an embodiment of the multifunctional soybean milk maker of the present invention, wherein the head lower cover is connected with the connector, the lower end of the connector is as the flow-disturbing cover, and the heating is performed by the electrothermal tube;

FIG. 15 is a front schematic view of another embodiment of the flow-disturbing cover of the multifunctional soybean milk maker of the present invention;

FIG. 16 is a top schematic view of FIG. 15;

FIG. 17 is a front schematic view of a further embodiment of the flow-disturbing cover of the multifunctional soybean milk maker of the present invention;

FIG. 18 is a top schematic view of FIG. 17;

Figure 1:
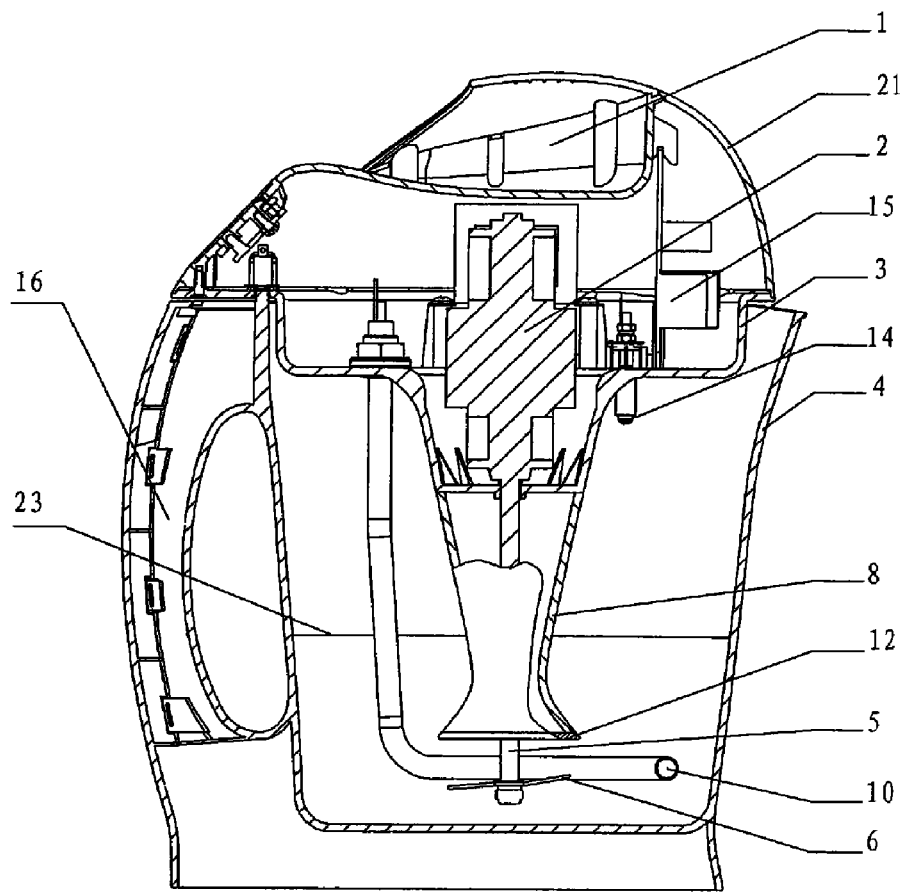
FIG. 1 is a schematic structural sectional view of a full automatic soybean milk maker, an embodiment of the multifunctional soybean milk maker of the present invention, wherein the three components, i.e. the head lower cover, the connector and the flow-disturbing plate, are connected and the heating is performed by the electrothermal tube.

The name of each component indicated in the drawings.
1. head;
2. motor;
3. head lower cover;
4. cup body;
5. cutter shaft;
6. cutting tool;
7. motor shaft;
8. connector;
9. upper coupling;
10. electrothermal tube;
11. electric heating disc;
12. transverse flow-disturbing plate 13. flow-disturbing cover
14. anti-overflow electrode
15. control circuit board
16. handle
17. notch
18. lower coupling
19. panel
20. electromagnetic heating device
21. upper cover
22. electrothermal ring
23. liquid level

DETAILED DESCRIPTION OF THE INVENTION

In order to further simplify the structure of a soybean milk maker, to achieve excellent crushing effect and cleaning convenience and to overcome disadvantages of producing much foam and louder noise during pulping, the inventor has further developed and concluded a novel technical solution as the multifunctional soybean milk maker of the present invention. Soybean milk, rice paste and vegetable soup etc. can be suitably made by using this technical solution.

When the present invention is specifically carried out, the main parts to implement the crushing and pulping process are a cutting tool, a cup body, a head lower cover, a connector and a flow-disturbing curved body. The head lower cover, the connector and the flow-disturbing curved body may be sequentially and integrally connected, or the head lower cover may be connected with the connector and the lower end of the connector itself is the flow-disturbing curved body, or the connector may be manufactured integrally with the head lower cover and the flow-disturbing curved body is disposed at the lower end thereof, or the connector may be manufactured integrally with the head lower cover and the lower end thereof is the flow-disturbing curved body. The flow-disturbing curved body may be a transverse flow-disturbing plate or a flow-disturbing cover with its opening facing downward.

Currently, in an existing common household soybean milk maker with a motor-top-mounted cutting tool, the high speed rotation in water of the cutting tool driven by a cutter shaft may produce a rotating flow rising upward along the longitudinal direction of the cup wall in the barrel-like cup body, beans in water also flow upward along with the rotating flow. Such flow pattern reduces the contact probability of the beans with the cutting tool, and thus is not favorable for crushing and pulping of the beans. In view of this, a soybean milk maker with a filter cover for restricting flowing of the beans has been designed, which allows the beans to flow only in a relatively small space, and thus increases the contact probability of the beans with the cutting tool so as to achieve the purpose of pulping. Then, through the pressure difference created by the cutting tool rotating at high speed within the filter cover, liquids inside and outside the filter cover are cyclically exchanged, and the soybean milk can flow out into the cup body through the filter cover. Currently, such an existing soybean milk maker has solved the pulping problem while also brought about other prominent problems, for example, the motors is under heavy work load and is not stable, working noise is loud, a large amount of foam is produced during pulping, and the filter net is difficult to clean, etc.

In view of this, the starting point of the concept of the present invention is to achieve the purpose of pulping without providing a filter cover. The inventor has noted that the rising-up rotating flow effect acted on the liquid by the cutting tool of the existing soybean milk maker during working has both advantage and disadvantage to the pulping effect. To overcome the disadvantage, in the present invention it is proposed a solution of providing a flow-disturbing curved body above the cutting tool. It goes without saying, as main working parts for pulping of a soybean milk maker, both the flow-disturbing curved body and the cutting tool should be in the liquid within the cup body. The cutting tool is rotated under the liquid. Since no filter cover is provided, the crushing and mixing chamber can be made larger and thus the material can flow sufficiently. Compared with the prior art of filter net, the motor is less loaded and is stable, and as the required motor power is reduced, the motor runs smoothly with little noise during working, therefore the reliability of the motor is relatively high. Further, since the present invention provides a flow-disturbing curved body above the cutting tool, which can bring about positive effects of transversely preventing the bean flow from rotatingly flowing upward and of turning rotating flow into turbulence. This not only increases opportunities of the beans being crushed and ground by the cutting tool, but also reduces opportunities of mixing the air with the pulp liquid, therefore little foam is produced during pulping. In the prior art, typically the pulp foam is used as an anti-overflow working medium, however, if the amount of the pulp foam is large, the heating time will be influenced, and the cooking effect of the soybean milk is bad. In the technical solution of the present invention, less pulp foam is produced during pulping, such that more effective pulp cooking time may be acquired when cooking the pulp, and the soybean milk can be cooked more sufficiently, therefore the taste and quality of the soybean milk is improved. Accordingly, in the case that no filter cover is provided, the present invention not only achieves the purpose of making pulp without a filter cover, but also brings about such positive effects as allowing the motor to run smoothly with little running noise, producing little pulp foam during pulping, and easy cleaning. Furthermore, in addition to making soybean milk, the multifunctional soybean milk maker of the present invention is also completely adapted to such applications as making fruit and vegetable pulp, rice paste, and vegetable soup.

In order to facilitate understanding by those skilled in the art, a detailed explanation is now provided in conjunction with the drawings and the embodiments.

Referring to FIGS. 1 to 21, as an embodiment, the multifunctional soybean milk maker of the present invention includes a head 1, a motor 2, a cup body 4, a cutter shaft 5, a cutting tool 6, and a control circuit board 15. The control circuit board 15 can control the motor 2 to act. The head 1 is capped on the cup body 4. The motor 2 is fixedly arranged in the head 1. The head 1 includes an upper cover 21 and a head lower cover 3. The cutter shaft 5 extends downward to the cup body 7. The cutting tool 6 is fastened at the front end of the cutter shaft 5. A connector 8 is fixedly arranged at the lower portion of the head lower cover 3 (in this embodiment the fixed arrangement of the connector is taken as an example, but it is not limited thereto, the connector 8 can also be manufactured integrally with the head lower cover 3, etc.). The connector 8 extends into the cup body 4. A flow-disturbing curved body is fixedly arranged at the lower end of the connector 8 and positioned above the cutting tool 6. The flow-disturbing curved body may be a transverse flow-disturbing plate 12 transversely provided above the cutting tool 6. The flow-disturbing curved body may also be a flow-disturbing cover 13 that opens downward and mantles over the cutting tool 6. Referring to FIGS. 13-20 in some embodiments, the flow-disturbing cover 13 is provided with notches 17 on its side surface to facilitate the strengthening of disturbing the liquid flow and changing the direction of movement of the beans, thus improving the pulping efficiency.

The connector 8 is a fixing carrier for the flow-disturbing curved body. As shown in FIGS. 1-12, as an embodiment, it may be such that the head lower cover 3, the connector 8 and the flow-disturbing curved body 12 or 13 are fixedly connected in sequence; or it may be such that the upper end of the connector 8 is fixedly connected with the head lower cover 3 and the lower end of the connector 8 itself is shaped into the flow-disturbing curved body 12 or 13; or it may be such that the connector 8 is manufactured integrally with the head lower cover 3 and the flow-disturbing curved body 12 or 13 is disposed at the lower end thereof; it may also be such that the connector 8 is manufactured integrally with the head lower cover 3 and its lower end itself is shaped into the flow-disturbing curved body 12 or 13.

As shown in FIGS. 1-12, as an example of the embodiment of the multifunctional soybean milk maker of the present invention, the cutter shaft 5 may be a motor shaft 7 of the motor 2, in other words, the cutting tool 6 is directly fixed at the front end of the elongate shaft of the motor 2. The cutter shaft 5 may also be connected with the motor shaft 7 through engagement of a lower coupling 18 and an upper coupling 9, so that the technical specification requirements of the motor 2 can be lowered.

Figure 2:
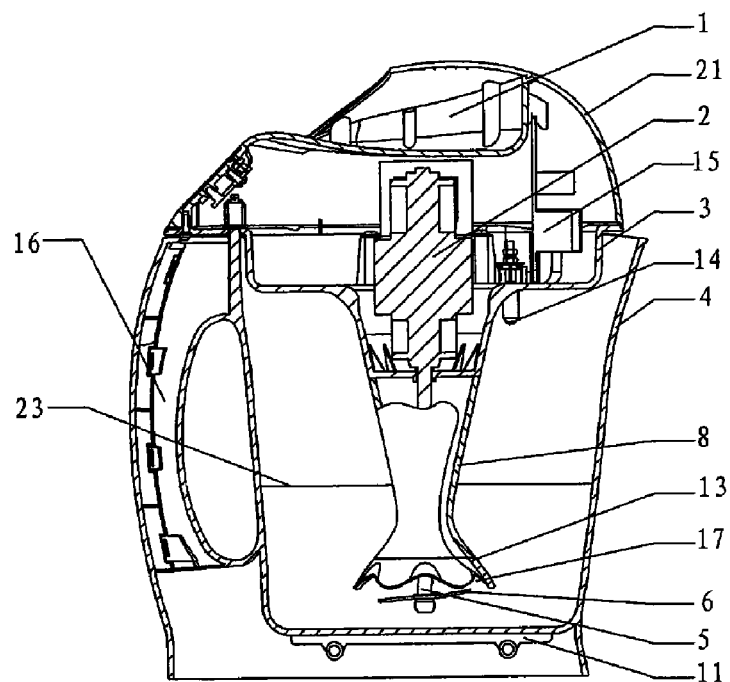
FIG. 2 is a schematic structural sectional view of a full automatic soybean milk maker, an embodiment of the multifunctional soybean milk maker of the present invention, wherein the three components, i.e. the head lower cover, the connector and the flow-disturbing cover, are connected and the heating is performed by the electric heating disc.
Figure 3:
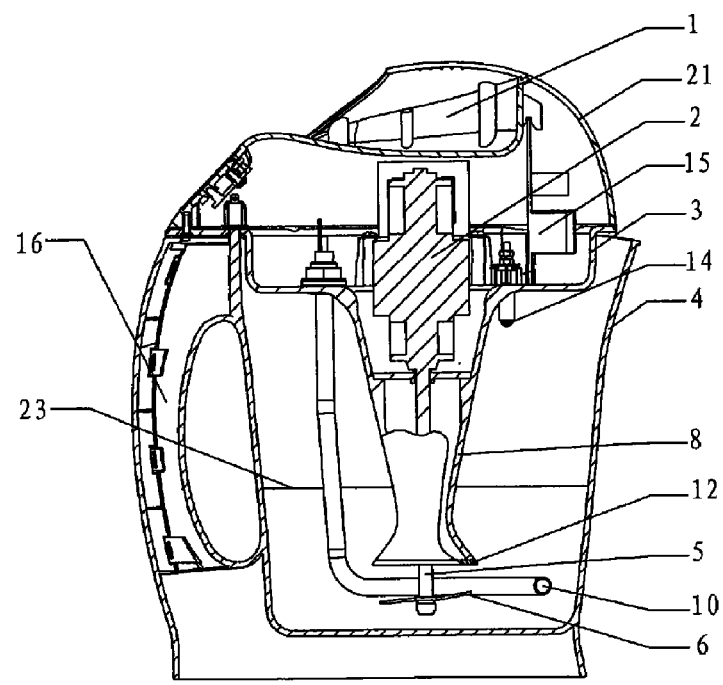
FIG. 3 is a schematic structural sectional view of a full automatic soybean milk maker, an embodiment of the multifunctional soybean milk maker of the present invention, wherein the head lower cover and the connector are formed integrally, the flow-disturbing plate is connected thereto, and the heating is performed by the electrothermal tube.
Figure 4:
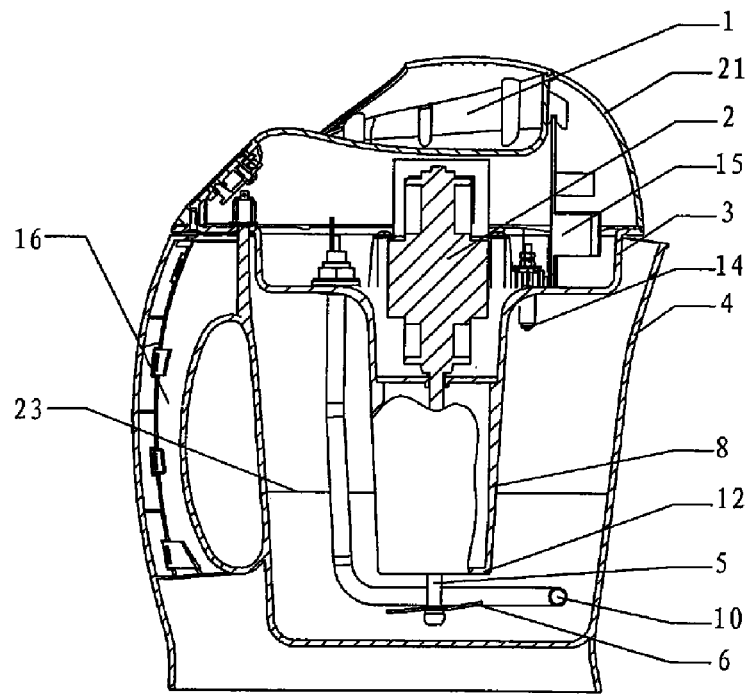
FIG. 4 is a schematic structural sectional view of a full automatic soybean milk maker, an embodiment of the multifunctional soybean milk maker of the present invention, wherein the three components, i.e. the head lower cover, the connector and the flow-disturbing plate are integral, and the heating is performed by the electrothermal tube.
Figure 5:
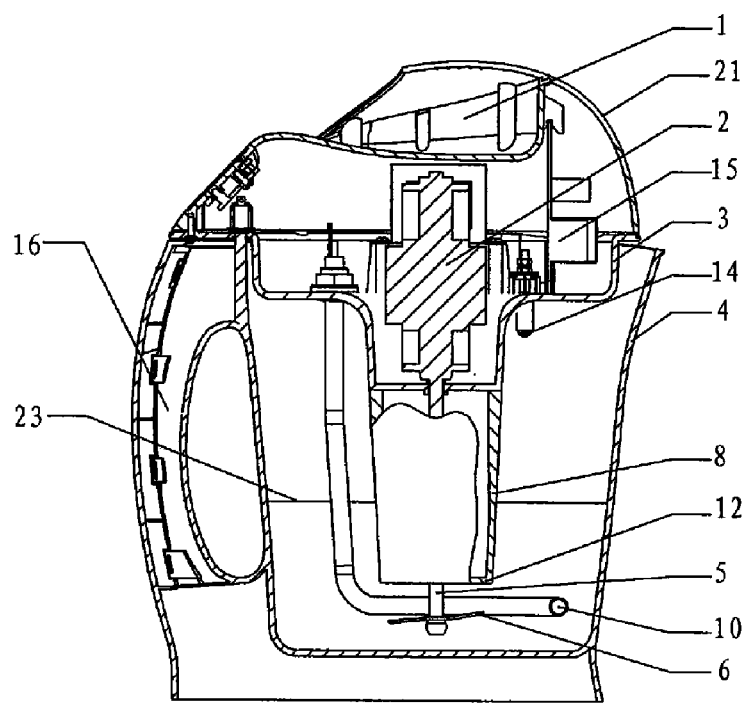
FIG. 5 is a schematic structural sectional view of a full automatic soybean milk maker, an embodiment of the multifunctional soybean milk maker of the present invention, wherein the head lower cover is connected with the connector, the lower end of the connector is as the flow-disturbing plate, and the heating is performed by the electrothermal tube.
Figure 8:
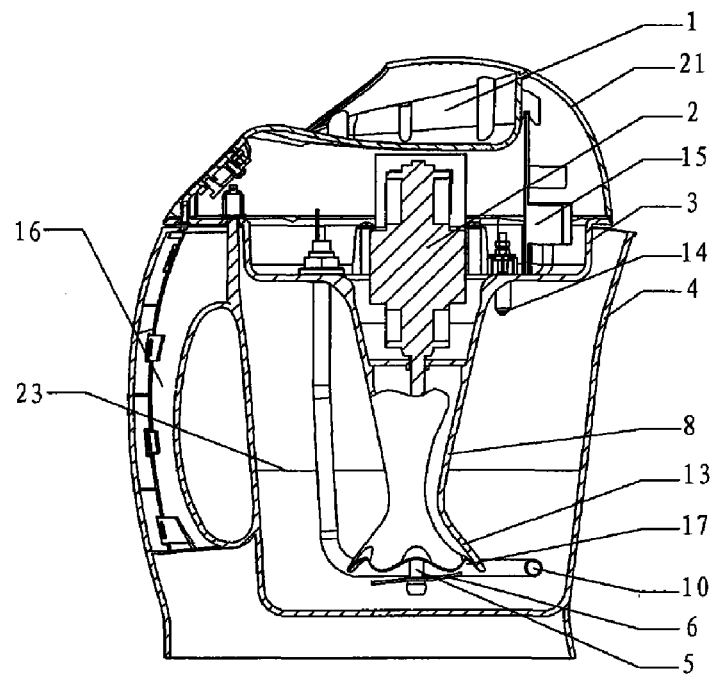
FIG. 8 is a schematic structural sectional view of a full automatic soybean milk maker, an embodiment of the multifunctional soybean milk maker of the present invention, wherein the three components, i.e. the head lower cover, the connector and the flow-disturbing cover are integral, and the heating is performed by the electrothermal tube.
Figure 9:
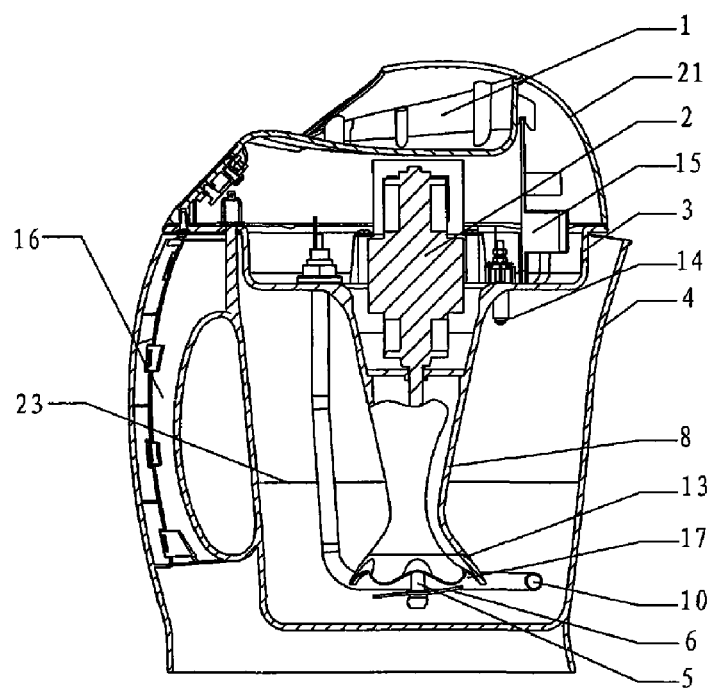
FIG. 9 is a schematic structural sectional view of a full automatic soybean milk maker, an embodiment of the multifunctional soybean milk maker of the present invention, wherein the head lower cover and the connector are formed integrally, the flow-disturbing cover is provided at the lower end thereof, and the heating is performed by the electrothermal tube.
Figure 10:
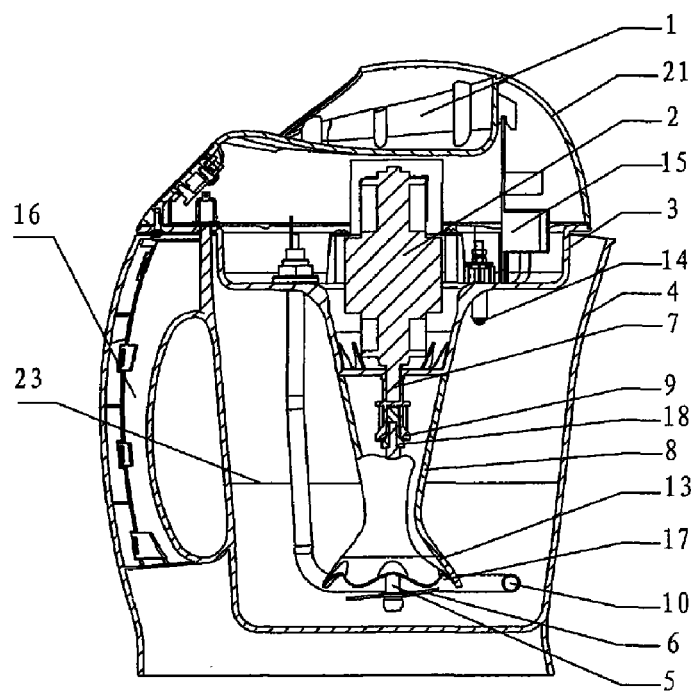
FIG. 10 is a schematic structural sectional view of a full automatic soybean milk maker, an embodiment of the multifunctional soybean milk maker of the present invention, wherein the three components, i.e. the head lower cover, the connector and the flow-disturbing cover, are connected, the heating is performed by the electrothermal tube and the cutter shaft and the motor shaft are connected by the coupling.
Figure 11:
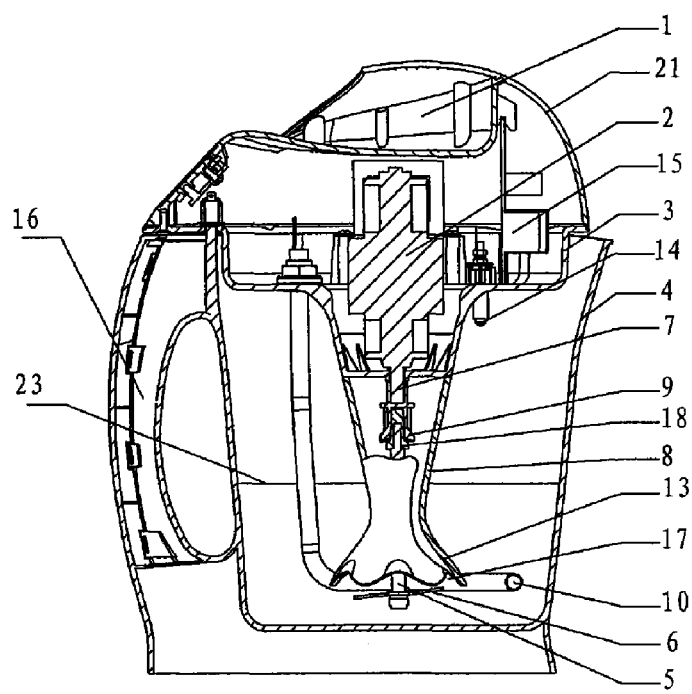
FIG. 11 is a schematic structural sectional view of a full automatic soybean milk maker, an embodiment of the multifunctional soybean milk maker of the present invention, wherein the head lower cover is connected with the connector, the lower end of the connector is as the flow-disturbing cover, the heating is performed by the electrothermal tube and the cutter shaft and the motor shaft are connected by the coupling.
Figure 12:
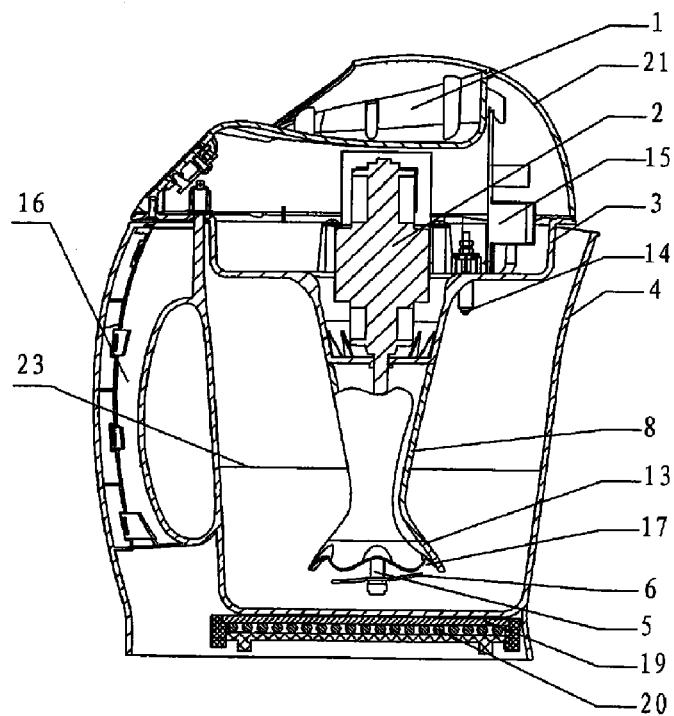
FIG. 12 is a schematic structural sectional view of a full automatic soybean milk maker, an embodiment of the multifunctional soybean milk maker of the present invention, wherein the electromagnetic heating device is provided.
Figure 13:
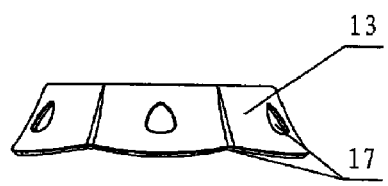
FIG. 13 is a front schematic view of an embodiment of the flow-disturbing cover of the multifunctional soybean milk maker of the present invention.
Figure 14:
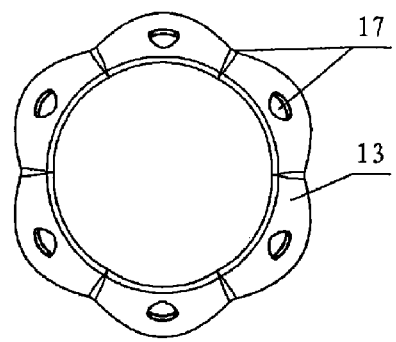
FIG. 14 is a top schematic view of FIG. 13.
Figure 19:
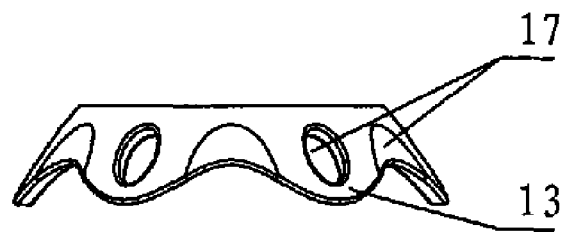
FIG. 19 is a front schematic view of yet another embodiment of the flow-disturbing cover of the multifunctional soybean milk maker of the present invention.
Figure 20:
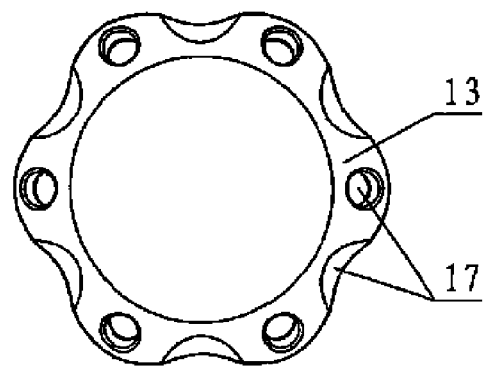
FIG. 20 is a top schematic view of FIG. 19.
Figure 21:
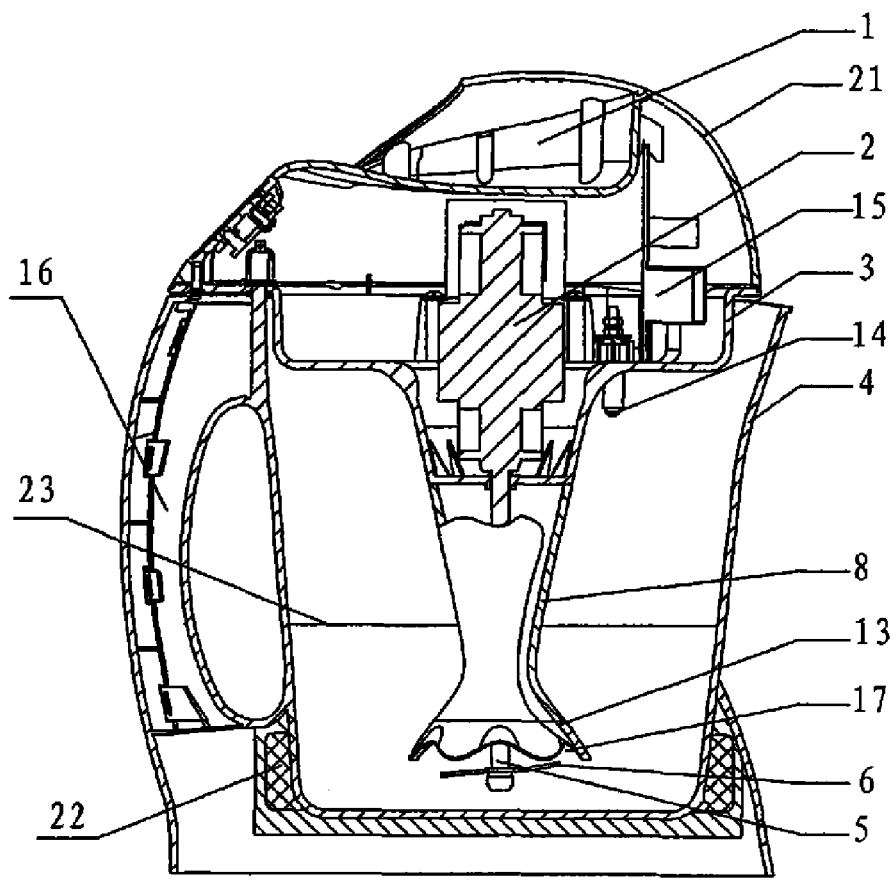
FIG. 21 is a schematic structural sectional view of a full automatic soybean milk maker, an embodiment of the multifunctional soybean milk maker of the present invention, wherein the electrothermal ring is disposed at the lower portion of the cup body.

By utilizing the prior art, the multifunctional soybean milk maker of the present invention may be further provided with a heating device. An upper end of an electrothermal tube of the heating device is fixedly arranged on the lower end surface of the head lower cover 3, as shown in FIGS. 1 and 3-11; or the cup body 4 is placed on an electric heating disc 11 of the heating device; or an electrothermal ring is disposed around the lower portion of the cup body 4; or an electromagnetic heating device may also be provided, as shown in FIGS. 2 and 12, the electromagnetic heating device is placed at the lower portion of the cup body 4 and contacted therewith, thereby an fully automatic soybean milk maker is made. The control circuit board 15 can control the electrothermal tube 10 to act. By referring to FIGS. 1-12 and the name description for components in the description, the structure of the embodiment may be better understood. In the embodiment, those parts relating to the prior art, which is known technology to those skilled in the art, will not be repeated herein.

The above description is provided with reference to the embodiments of the present invention, and what is described above is only concerning preferable embodiments of the present invention. It should be noted, for those skilled in the art, a number of changes and modifications may be further made without departing from the principle of the present invention and should be considered as being within the scope of protection of the present invention.

What is claimed is:

1. A multifunctional soybean milk maker without a filter cover, comprising:
   a head including an upper cover and a head lower cover,
   a motor fixedly arranged in the head,
   a cup body capped by the head,
   a cutter shaft extending downward to the cup body,
   a cutting tool fixed at the front end of the cutter shaft, and
   a control circuit board,
   a connector provided at the lower portion of the head lower cover, wherein the connector extends downwardly to be adjacent to the cutting tool in the cup body, and
   a flow-disturbing curved body is provided at the lower end of the connector, wherein the flow-disturbing curved body is configured to disturb a bean flow inside the cup body and is positioned above the cutting tool.

2. The multifunctional soybean milk maker according to claim 1, wherein the lower end of the connector is formed as the flow-disturbing curved body.

3. The multifunctional soybean milk maker according to claim 1 wherein the connector is manufactured integrally with the head lower cover, and the flow-disturbing curved body is provided at the lower end thereof.

4. The multifunctional soybean milk maker according to claim 1, wherein the connector is manufactured integrally with the head lower cover, and the lower end thereof is formed as the flow-disturbing curved body.

5. The multifunctional soybean milk maker according to claim 1, wherein the flow-disturbing curved body is a transverse flow-disturbing plate.

6. The multifunctional soybean milk maker according to claim 1, wherein the flow-disturbing curved body is a flow-disturbing cover with its opening facing downward.

7. The multifunctional soybean milk maker according to claim 6, wherein notches are provided at the side surface of the flow-disturbing cover.

8. The multifunctional soybean milk maker according to claim 1, wherein a motor shaft of the motor acts as the cutter shaft.

9. The multifunctional soybean milk maker according to claim 1, wherein the upper end of the cutter shaft is connected with the motor shaft through a coupling.

10. The multifunctional soybean milk maker according to claim 1, wherein a heating device is further provided, and an upper end of an electrothermal tube of the heating device is fixedly arranged on the lower end surface of the head lower cover.

11. The multifunctional soybean milk maker according to claim 1, wherein a heating device is further provided, and the cup body is placed on an electric heating disc of the heating device.

12. The multifunctional soybean milk maker according to claim 1, wherein a heating device is further provided, and the lower portion of the cup body is surrounded by an electrothermal ring of the heating device.

13. The multifunctional soybean milk maker according to claim 1, wherein an electromagnetic heating device is further provided which is positioned at the lower portion of the cup body.

* * * * *